Patented Aug. 20, 1929.

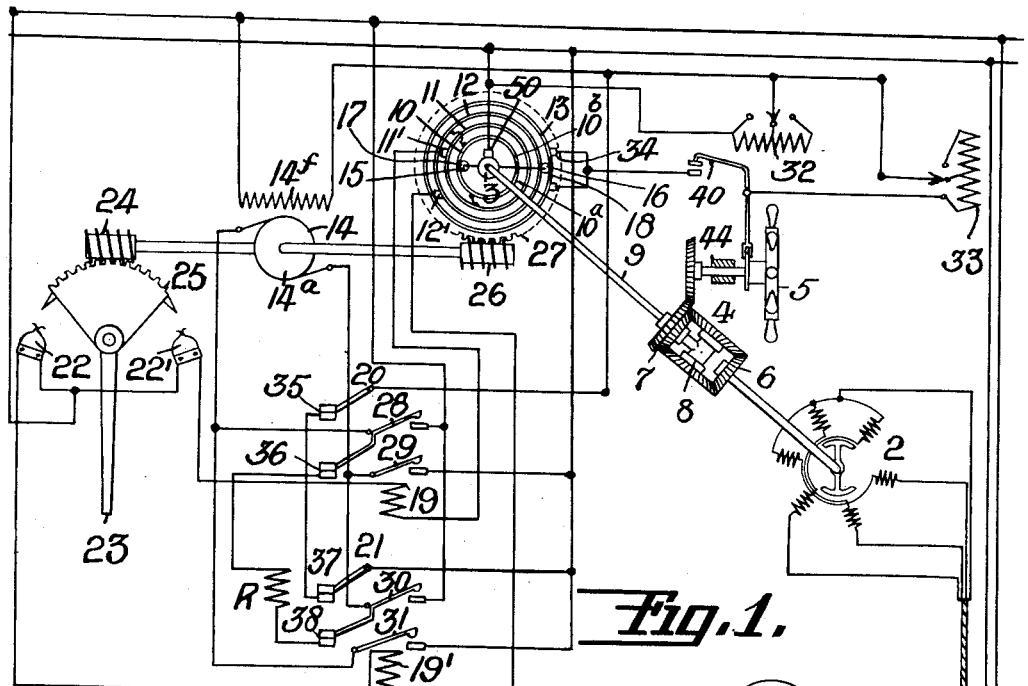

1,725,599

UNITED STATES PATENT OFFICE.

ELMER A. SPERRY, JR., OF BROOKLYN, NEW YORK, ASSIGNOR, BY MESNE ASSIGNMENTS, TO SPERRY GYROSCOPE COMPANY, INC., A CORPORATION OF NEW YORK.

AUTOMATIC PILOT.

Application filed May 6, 1926. Serial No. 107,035.

This invention relates to the automatic steering of dirigible vehicles and especially of ships. While automatic pilots, if so designed and adjusted, will maintain a ship accurately on its course, such a pilot is found to be unsatisfactory from an engineering rather than from a navigating standpoint, in rough weather. In other words, an adjustment of the automatic steering apparatus which will steer a close course in calm weather is not satisfactory in rough weather, largely for the reason that the automatic steering apparatus, in endeavoring to prevent all yawing, will cause undue wear and tear on the steering engines. In my prior applications, No. 630,853, filed April 9, 1923 (now Patent No. 1,695,615, dated December 18, 1928), and No. 713,711 filed May 16, 1924, I provide what I therein refer to as a "weather" adjustment for reducing the running of the steering engines in rough weather. This is accomplished by providing a variable lost motion device between the master compass and the controller so that the sensitiveness of the control is reduced for rough weather by a manual setting of the device. Experience has shown, however, that undue running of the steering engine in a rough sea still takes place on many ships, partly for the reason that the navigating officers fail to make use of the "weather" adjustment when the sea is rough. In addition, as is well known, the rolling, pitching and yawing of the ship does not remain constant for any great length of time but is continually varying as the size and spacing of the individual waves and the angle at which they strike the ship vary.

The object of the present invention is to provide an automatic means which will permit accurate, close steering when such is possible and at the same time will reduce the running of the steering engines when the yawing of the ship is such as to cause undue wear and tear thereon. By careful observation of the behavior of ships under varying weather conditions, I found that the ordinary yawing of a ship is of a comparatively small magnitude, say on the order of one or two degrees and takes place comparatively slowly, i. e. on the order of one to two minutes. On the other hand, say in a quartering rough sea, the yaw becomes on the order of three to fifteen degrees or more and takes place much more rapidly, i. e., in from 8 to 12 seconds, more or less. In automatic steering devices as previously constructed, the steering engine would be actuated violently every time one of these rapid large motion yaws took place, (in the absence of the proper weather adjustment), but on account of their rapidity the effect on the ship would be very little since before the rudder could take effect the ship would be yawing in the other direction. By my invention I interpose a means which will greatly reduce the running of the steering engine for these rapid large motion yaws, which I designate for lack of a better term "weather" yaw. This may be accomplished by placing on the master controller an additional means which will automatically reduce the rudder action whenever the deviation of the ship exceeds a predetermined amount by greatly reducing the normal speed of the steering engine at that time, which is especially effective for the rapid weather yaw. By such or equivalent means the purpose of the invention is accomplished without diminishing the accuracy of normal steering in the least.

Another object of the invention is to improve upon the means heretofore employed to bring the steering engine quickly to rest when it is desired to stop the rudder. Instead of a separate mechanical brake for this purpose, I may employ a dynamic brake thus eliminating a separate mechanism for this purpose.

One method of accomplishing the purposes hereinbefore presented is disclosed in the accompanying drawings by way of illustration, in which Fig. 1 is a diagrammatic view coupled with a wiring diagram of my invention.

Fig. 2 is a sectional view of the controller taken on line 2—2 of Fig. 3.

Fig. 3 is a vertical section of the controller.

As this invention is an improvement on the inventions disclosed in my aforesaid applications, the drawings illustrate the same in diagrammatic form only, so as to show the principles of the invention unencumbered by a mass of mechanical detail.

Referring to Fig. 1, the master compass, which operates the automatic steering equipment, is represented at 1, said compass controlling the repeater motor 2 in the master controller. Said motor is represented as operating the contactor or trolley arm 3 of the master controller through differential gear 4 by means of which the course may be altered at will in the usual manner from the small pilot wheel 5. As shown, the motor 2 turns one arm 6 of the differential, the small pilot or trick wheel 5 adjusts another arm 7 of the same, while the planetary arm 8 is connected to the shaft 9 operating the trolley arm 3. The complementary portion of said controller is shown as comprising a plurality of contact rings 10, 11, 12 and 13. In Fig. 1 these rings are shown placed in developed form so that all appear in plan, but it may be noted that they may be mounted one above the other as shown in Fig. 3. The ring 10 corresponds to the usual split controller ring comprising two halves $10^a$ and $10^b$, one of which operates the reversible steering motor or engine 14 in one direction and the other in the opposite direction. Trolley 15 on arm 3 bears on said ring and current is introduced into the same from brush 50 engaging collector ring 51. Rings 11 and 12 are continuous collector rings connected respectively with halves $10^a$ and $10^b$ of ring 10. On rings 11 and 12 bear respectively brushes 11' and 12'.

One method of carrying out my invention is to place an additional ring 13 on the contactor on which bears a trolley 16 mounted preferably on the same arm 3 as trolley 15. While the two halves $10^a$ and $10^b$ are separated by comparatively narrow insulated sections 17, the ring 13 is provided with a much broader insulated section 18. Slight turning movements of the ship, therefore, will displace trolley 15 from the insulated section 17 and bring it in contact with the proper contact section $10^a$ or $10^b$, while at that time trolley 16 will remain on the insulated strip 18. Greater turning movements, however, will bring the trolley 16 onto the live section of the ring 13. The motor 14 is shown diagrammatically as operating the rudder by means of worm 24 on the shaft thereof, meshing with the worm sector 25 on the rudder post. It will be understood, however, that said motor may either operate the rudder directly or indirectly through the usual steam steering engine, which acts as a power multiplier. The motor also operates the follow-up connection to the controller which is shown diagrammatically as a worm 26 operating from the motor shaft and turning the worm wheel 27 which rotates the contactor rings 10, 11, 12 and 13. (See Figs. 1 and 3.)

The motor 14 may be controlled from said contacts as follows: Contact sections $10^a$ and $10^b$ are respectively in circuit with the controlling coils 19 and 19' of relays 20 and 21. Also placed in circuit with said relay coils respectively are limit switches 22 and 22' which are opened as the rudder 23 reaches one or the other of its limiting positions. The switches 28 and 29 controlled by coil 19 close the circuit of the armature $14^a$ of the motor 14 to drive it in one direction, while the switches 30 and 31 controlled by coil 19' close the circuit through said armature in the opposite direction.

For regulating the speed of the motor I prefer to employ a field control although obviously any other known type of speed control may be employed. Accordingly in circuit with the field $14^f$ of the motor I place an adjustable rheostat 32 which may be set by hand to vary the field strength and thereby give the motor the proper maximum speed for manual and also for automatic steering. This should be adjusted so that the motor operates fast enough to move the helm through a greater angle than the ship yaws in the same or less time, and also to enable the pilot to change the course quickly. For example, the maximum motor speed may be adjusted so that the motor is able to move the rudder at the rate of 70° in 18 seconds.

As above explained, while this rapid movement of the steering is necessary to steer an accurate course, such actuation in rough weather results only in imposing on the steering engine a much heavier duty than it is normally capable of withstanding, resulting in rapid and undue wear thereof. To reduce this wear I interpose a second resistance 33 in the field circuit which is automatically controlled from the ring 13 on the master controller, said resistance being connected to one side of the field $14^f$ and at the other side to brush or brushes 34, engaging ring 13. When the trolley 16 is on the insulated section 18, said resistance is not in the field circuit, at which time the current passes through the field and through resistance 32. When, however, the ship yaws sufficiently to bring contact 16 in engagement with the live portion of the ring 13, the resistance 33 is thrown in parallel with the resistance 32 thus strengthening the field of the motor and hence reducing its speed. Preferably I so proportion the resistances that when the resistance 33 is in circuit the speed of the motor will be greatly reduced, say from $\frac{1}{2}$ to $\frac{1}{5}$ or more of its normal speed, or in other words, so as to operate the motor sufficiently slowly to cause the angular position of the rudder to lag behind the yaw of the ship. Resistance 33 may also be made variable so that it may be adjusted to suit the particular requirements of the ship in the best judgment of the navigator.

Referring again to the relays 20 and 21, I preferably place additional or back contacts 35, 36, 37 and 38 thereon for the purpose of bringing the motor quickly to rest when the circuit is broken, either at the master controller or at the rudder limit switches. As shown, contacts 35, 36 when closed short-circuit both resistances 32 and 33, so as to give the field a maximum strength at that time. On the other hand, contacts 36 and 38 short-circuit the armature $14^A$ through resistance R. This will result, of course, in heavy dynamic braking, bringing the motor quickly to rest. This arrangement also has the advantage that the motor has a maximum field just before or at the time it is started up in the opposite direction so as to aid in securing a quick start. As the back contacts are opened, however, and the front contacts closed, resistance 32 is thrown into the field circuit to give the motor the proper speed.

When steering by hand, or when changing the course through handwheel 5, the navigator may find it desirable to prevent the reduced speed device from coming into action. To this end I have shown a throwout switch 40 in the circuit of resistance 33, so that by opening the switch, the motor is maintained at its fast speed regardless of magnitude or the rapidity of relative displacement of the two parts of the controller. Said switch may be operated from handwheel, as by slidably mounting the handwheel shaft 42 and its connected bevel gear 43 in its bearing 44, so that when the parts are in the position shown for manual steering the switch will be open, but when pulled to the right in Fig. 1 said switch will be closed as the hand steering means is thrown out of action. It will be understood that said sliding movement of the handwheel may also perform the other functions described in my aforesaid prior application No. 713,711, if desired.

The operation of my device is as follows: In calm water the normal slow yawing of the craft results only in the displacement of the trolley 15 from the insulated section 17 so that the steering engines would be promptly actuated at normal speed to bring the ship back on its course. If, however, rougher water was encountered and the rapid large amplitude yawing started up, as hereinbefore explained, the trolley 16 would be brought into contact with the live portion of ring 13, thus throwing in the resistance 33 to cause the motor to operate slowly with the result that its movements are very greatly reduced. In actual operation during such large amplitude quick yawing, the trolley 16 is moved over on to sector 13 so quickly that the steering engine does not have time to get up to normal speed as trolley 15 passes over sector 10$^a$ or 10$^b$, before the resistance 33 is cut in so that the result is that the motor is operated throughout this period of unusual disturbance at a much less speed and hence to a much less amplitude. Not only does this reduce the wear and tear on the steering engine but it does not interfere with the accurate steering, since it is found that the much slower movements of the rudder under these conditions will cause the mechanism to find an average or mean position of the rudder requiring a minimum of adjustment thereof. When changing course, or when steering by hand, the slow speed operation may be eliminated, as explained.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic steering device, the combination with the steering engine, means normally operative to bring the said engine into operation at normal speed as normal yawing occurs, and means responsive to extraordinary yawing for operating said engine at a less speed.

2. In an automatic steering device for ships, the combination with the steering engine, a multispeed controller therefor, and means for bringing said controller into action to operate said engine at speeds varying inversely as the magnitude of the yaw.

3. In an automatic steering device for ships having a rudder, means for normally operating the rudder, means for slowing down the rudder action, and means responsive to the magnitude of the yaw for bringing said first name means into action.

4. In an automatic steering device for ships, a steering engine having at least two speeds, one sufficiently fast to move the helm through a greater angle than the ship yaws in the same or less time, and the other sufficiently slow to cause the angular position of the rudder to lag behind the yaw of the ship, means for normally causing the faster speed to be effective, and means for bringing said slower speed into operation.

5. In an automatic steering device for ships, a steering engine having at least two speeds, one sufficiently fast to move the helm through a greater angle than the ship yaws in the same or less time and the other sufficiently slow to cause the angular position of the rudder to lag behind the yaw of the ship, means for normally causing the faster speed to be effective, and automatic means responsive to weather yawing for bringing said slower speed into operation.

6. In an automatic steering device for ships having a rudder, means for normally operating the rudder, means for reducing the rudder action, means responsive to the magnitude of the yaw for bringing said first-named means into action, and means for preventing said other means from operating when steering by hand.

7. In an automatic steering device for ships, a steering engine having at least two speeds, one sufficiently fast to move the helm through a greater angle than the ship yaws in the same or less time and the other sufficiently slow to cause the angular position of the rudder to lag behind the yaw of the ship, means for normally causing the faster speed to be effective, automatic means responsive to weather yawing for bringing said slower speed into operation, a hand steering device, and means controlled thereby for preventing the operation of said last-named means.

8. As a means of lessening rudder action in an automatic steering device during rough weather, the combination with the rudder, of a two-part electrical controller, a compass means for controlling one part of said controller, a steering motor, said controller governing the armature circuits of said motor, and additional contacts on said controller for altering the field strength of said motor.

9. In an electrical automatic steering device, the combination with an electric motor steering engine, a master compass-governed controller, a group of contacts thereon for making, breaking and reversing the flow of current through the armature thereof, means governed by the course of the ship for governing the relative position of said contacts, a second group of contacts on said controller for varying the field strength of said motor, and means also governed by the ship's course for governing the relative position of said last mentioned contacts.

10. In an automatic steering device for ships, the combination with the steering engine and rudder, means normally operative to move said engine and rudder at a normal rate as normal yawing occurs, and means responsive to extraordinary yawing for reducing the rudder action.

11. In an automatic steering device for ships having a rudder, means for normally operating the rudder, means for reducing the normal rudder action to limit the rudder throw, and means responsive to the magnitude of the yaw for bringing said first named means into action.

12. As a means of lessening rudder action in an automatic steering device during rough weather, the combination with the rudder, of a two-part electrical controller, a compass means for controlling one part of said controller, a steering motor, said controller normally governing said motor, and additional contacts on said controller operative to reduce the movements of the motor when brought into action.

13. The method of lessening rudder action in an automatic steering device in rough weather, which consists in reducing the speed of operation of the rudder below that of the angular velocity of weather yaw and below that normally employed for steering in moderate weather.

14. In an automatic steering device for ships, a steering engine, a rudder turned thereby, and means for operating said engine at a slower rate than sufficient to correct for weather yaw when weather yawing is occurring and means for operating the rudder at a greater speed during moderate weather.

In testimony whereof I affix my signature.

ELMER A. SPERRY, Jr.